United States Patent Office 3,505,301
Patented Apr. 7, 1970

3,505,301
COPOLYMERS OF ETHYLENE, HIGHER ALPHA-OLEFINS, AND MONOCYCLOMONOOLEFINS OR ALKYL DERIVATIVES THEREOF
Giulio Natta, Gino Dall'Asta, Giorgio Mazzanti, Italo Pasquon, Alberto Valvassori, and Adolfo Zambelli, Milan, Italy, assignors to Montecatini Edison S.p.A., Milan, Italy
No Drawing. Continuation of application Ser. No. 282,166, May 21, 1963. This application Jan. 18, 1967, Ser. No. 610,037
The portion of the term of the patent subsequent to Sept. 24, 1985, has been disclaimed
Int. Cl. C08f 15/40
U.S. Cl. 260—80.78                17 Claims

ABSTRACT OF THE DISCLOSURE

There are provided amorphous copolymers of ethylene, at least one higher alpha-olefin, and monocyclomonoolefines or alkyl-substituted monocyclomonoolefins containing 4 to 8 carbon atoms in the ring, and of the type of cyclobutene and 4-methyl-cyclopentene-1.

---

This is a continuation of application Ser. No. 282,166, filed May 21, 1963, and now abandoned.

This invention is directed to the preparation of linear polymerized units of ethylene; of ethylene, cycloolefins or alkylcycloolefins, and at least one alpha-olefin having the general formula R—CH=CH$_2$ wherein R is an alkyl group containing from 1 to 6 carbon atoms. Heretofore, polymers of ethylene with cycloolefins were disclosed in the Belgian Patent No. 619,877.

Now it has been discovered, however, quite unexpectedly, that it is possible to prepare copolymers containing at least three components consisting of:

(1) Monomeric units derived from ethylene.
(2) Polymerized units of a monocyclomonoolefin or of an alkyl-substituted monocyclomonoolefin containing approximately 4 to 8 carbon atoms in the cycle and
(3) Polymerized units of at least one alpha-olefin having the general formula R—CH=CH$_2$, wherein the R is an alkyl radical containing from 1 to 6 carbon atoms.

Copolymers containing polymerized units of at least three of the above-mentioned monomers were unforeseen, since it is known that cycloolefins having more than 4 carbon atoms in the ring cannot be used to prepare high-molecular weight homopolymers having enchained cycloaliphatic rings, particularly with the catalysts described hereinafter.

High molecular weight polymeric products containing units deriving from the said cycloolefins could be obtained, as described in Belgian Patent No. 619,877, only by carrying out the copolymerization of cycloolefins with ethylene. This is probably due to the fact that the ethylene carbon atoms, not having other substituents but hydrogen atoms presenting a low bulkiness, bound to the carbon atoms of the double bond, by inserting themselves into the growing chain between two monomeric units deriving from the cycloolefins, remarkably reduce the steric hindrances which prevent the direct addition of a cycloolefin unit to another unit of the same type.

Since alpha-olefins, like cycloolefins, as a substituent of a carbon atom of the double bond present an alkyl group even if bound to only one of the carbon atoms of the double bond, it could be foreseen, for the said steric reasons, a stop in the copolymerization or at least the possibility of the binary copolymerization of ethylene with a cycloolefin or of ethylene with an alpha-olefin.

It was found that the tendency of the copolymers of this invention, i.e., copolymers containing at least three of the monomeric components, to assume the appearance of amorphous products having an elastomeric character is more pronounced in comparison with the binary copolymers discussed above. This is due to the contemporaneous presence of polymerized units of the three or, in some instances, more different, monomers, which cause a greater disorder in the linear macromolecule.

Typical examples of the alpha-olefins which are to be used for the preparation of terpolymers in accordance with this invention include propylene, butene-1, 3-methylbutene-1, pentene-1, 4-methyl-pentene-1, hexene-1, etc. Likewise, the cycloolefins which can be copolymerized include cyclobutene, cyclopentene, cyclohexene, cycloheptene, cis-cyclooctene, 4-methylcyclopentene-1, etc.

The high molecular weight terpolymers of this invention are solid and consist of linear macromolecules. Moreover, they can be either completely amorphous or have a reduced crystallinity of the type characterized by linear polyethylene. Thus, for example, in the preparation of an ethylene-propylene-cyclopentene terpolymer, amorphous products are obtained if the ethylene content does not exceed 75 molar percent. The amorphous polymers containing at least three components are completely extractable with boiling n-heptane, whereas the boiling ethyl ether on the other hand, removes only a portion of the crude product. It was found that the molar content of the monomers, in the fraction extractable with the boiling ether, did not differ remarkably from that fraction insoluble in the boiling ether, but extractable with the boiling heptane or even from that of the crude polymer.

This confirms that each macromolecule consists of polymerized units of all of the monomers used, namely that the products of this invention consist of terpolymers, quaterpolymers, etc., and are not simple mixtures of homo or binary copolymers.

The catalysts employed for purposes of the copolymerization of the monomers in accordance with this invention are prepared from vanadium compounds and organometallic compounds of metals selected from the Groups Ia, II and IIIa of the Periodic Table of Mendeleef. It is preferred to use catalyst systems which are colloidally dispersed or completely dissolved in the liquid phase in which the copolymerization reaction takes place. Examples which illustrate the vanadium compounds include VCl$_4$, VOCl$_3$, vanadium triacetylacetonate, vanadyl diacetylacetonate, ethylorthovanadate, etc. Also, the organometallic compounds include Al(C$_2$H$_5$)$_3$, Al(C$_4$H$_9$)$_2$Cl, Al(C$_3$H$_7$)$_2$Br, Al(C$_2$H$_5$)$_2$I, Be(C$_2$H$_5$)$_2$, Li(C$_4$H$_9$)

[Al(C$_2$H$_5$)X$_2$]$_2$Y wherein X is a halogen and Y is an electron-donor compound. The latter includes, for example, tertiary and secondary amines, onium salts, or an alkali or alkaline earth metal halide, etc.

Of the above, the preferred catalytic system includes those catalysts prepared from vanadium tetrachloride or the oxychloride with aluminum alkyls. Still another preferred catalyst includes those prepared from vanadium triacetylacetonate and the aluminum dialkylmonohalides. In addition, in place of the vanadium triacetylacetonate, the vanadylacetyl acetonates, vanadium chloroacetylacetonates or the alkyl orthovanadates can be used with completely satisfactory results.

The polymers of this invention are prepared by copolymerizing the monomers at a rather wide temperature range. More specifically, the copolymerization may take place at temperatures ranging from about —80° C. to +100° C. and more preferably between —50° C. and +50° C. In some instances, copolymerization can be carried out with the addition or in the presence of an inert solvent. However, this is not necessary and the solvent can be completely omitted. The solvents referred to are preferably the aliphatic or the aromatic hydrocarbons.

In order to obtain copolymers having as complete as possible a homogeneous composition, it is desirable to keep the ratio of the constituents constant during the copolymerization reaction. This can be accomplished, in a convenient manner, by continuously copolymerizing the constituents by continuously feeding and discharging or circulating the components at sufficiently high rates. The initial molar ratio ethylene/alpha-olefin/cycloolefin in the liquid phase preferably ranges from 1/0.5/10 to 1/100/500.

Typical preparations of the copolymers of this invention are illustrated by the following examples.

EXAMPLE 1

The reaction apparatus comprised a 500 cc. glass test tube provided with a gas inlet tube, a gas outlet tube, a mechanical agitator, and a thermometer sheath. The gas inlet tube reached the bottom of the vessel and ended with a porous diaphragm. Air was completely removed from the vessel and replaced by dry nitrogen. The reaction apparatus was held at a temperature —30° C.

50 cc. of anhydrous n-heptane and 50 cc. of radioactive cyclopentene, marked with $C^{14}$, were introduced and saturated at a temperature of —30° C. with a propylene-ethylene mixture. The propylene-ethylene mixture was added to the reaction mixture at a flow rate of about 100 N liters/hour. The molar ratio of the propylene and ethylene was approximately 2:1.

The catalyst was prepared under nitrogen, at a temperature of about —30° C., by mixing a solution of 9 millimols of aluminum tri-n-hexyl in 20 cc. of an anhydrous n-heptane with a solution of 3.6 millimols of vanadium tetrachloride in 20 cc. of anhydrous n-heptane. The catalyst was introduced into the reaction vessel immediately after its preparation. The ethylene-propylene mixture was continuously fed at a flow rate of about 100 N liters/hour.

Approximately 30 minutes after the introduction of the catalyst, the reaction was stopped by the addition of about 20 cc. of methanol. The product was purified by successive treatments, under nitrogen, with aqueous hydrochloric acid and water. The product was then completely coagulated with an excess of an acetone-methanol mixture.

After vacuum drying, approximately 4.5 grams of a white solid product were obtained. This product had a rubbery appearance and was shown to be completely amorphous by X-ray examination. The product was shown to contain, by radiochemical analysis, approximately 12.5% by mols of cyclopentene and the ethylene-propylene molar ratio, as determined by infrared, was approximately 1. The copolymer was extractable with boiling n-heptane and had an intrinsic viscosity determined in tetrahydronaphthalene at 135° C. of about 1.6.

EXAMPLE 2

The reaction apparatus as described in Example 1 was evacuated and held under nitrogen and thermostatized at —30° C. 100 cc. of radioactive cyclopentene marked with $C^{14}$ was introduced into the reaction apparatus. The monomer was then saturated at a temperature of about —30° C. by adding to it a mixture containing propylene and ethylene in a molar ratio of about 4 to 1 at a flow rate of 100 N liters/hour.

The catalyst was prepared, under nitrogen, at a temperature of about —30° C. by mixing 2.8 millimols vanadium triacetylacetonate and 14 millimols of aluminum diethyl monochloride in 30 cc. of anhydrous toluene. After about 1 hour, 5.5 grams of an ethylene-propylene cyclopentene terpolymer containing 8.5% by mols of the cyclopentene, as determined by radiochemical analysis, were obtained. The propylene-ethylene molar ratio was determined to be approximately 1 and the product was extractable completely with boiling n-heptane and appeared to be amorphous by X-ray examination.

EXAMPLE 3

The operating procedure and apparatus of Example 1 was repeated except 50 cc. of chlorheptene were used in place of the cycloheptene. After about 1 hour, 3.5 grams of the ethylene-propylene-cycloheptene terpolymer were obtained. The product appeared to be extractable with boiling n-heptane and was amorphous by X-ray examination.

EXAMPLE 4

The reaction apparatus comprised a 100 cc. three-necked flask provided with an agitator and gas inlet and outlet tubes. Approximately 20 cc. of cyclopentene were introduced into the apparatus and held at —20° C. A gaseous ethylene-propylene mixture in the molar ratio of about 1:2 was introduced through the gas inlet tube and circulated at a flow rate of approximately 200 N liters/hour.

The catalyst was preformed in a 100 cc. flask at a temperature of about —20° C., under nitrogen, by reacting 1 millimole of vanadyl trichloride and 2.5 millimols of aluminum trihexyl in 10 cc. of anhydrous n-heptane. The ethylene-propylene mixture was continuously fed and discharged at the flow rate of about 200 N liters/hour. After about 8 minutes, the reaction was stopped by adding 10 cc. of methanol containing 0.1 gram of phenylbetanaphthylamine.

The product was purified in a separating funnel under nitrogen by repeated treatments with aqueous hydrochloric acid and then subsequently with water. The product was then coagulated with acetone. After drying under a vacuum, approximately 2 grams of a solid product were obtained. The product was amorphous by X-ray examination, looked like a non-vulcanized elastomer, and was completely soluble in boiling n-heptane. An infrared spectrographic examination showed the presence of unsaturations with bands at about 6.1 microns, methyl groups with bands at 7.25 microns, and methylenic sequences of various lengths with bands between 13.3 and 14 microns.

Approximately 100 parts by weight of the copolymer was mixed in a laboratory roll mixer with about 1 part of tetramethylthoriumdisulphide and 0.5 part of mercaptobenzothiazole. The mixture was vulcanized in a press at a temperature of about 150° C. for about 60 minutes. A vulcanized lamina prepared from the product had the following characteristics:

Tensile strength—53 kg./cm.$^2$
Elongation at break—480%
Modulus at 300%—17 kg./cm.$^2$

EXAMPLE 5

Approximately 20 cc. of cyclopentene and 1 millimole of vanadium oxytrichloride were introduced into the reaction apparatus described in Example 4. A propylene-ethylene mixture in the molar ratio of about 2:1 was introduced through the gas inlet tube and circulated at a flow rate of about 15 N liters/hour.

A solution of about 2.5 millimols of aluminum trihexyl in 10 cc. of n-heptane was siphoned into the reaction apparatus, whereby polymerization started immediately. The propylene-ethylene mixture was continuously fed and discharged at a flow rate of about 15 N liters/hours. After about 12 minutes from the introduction of the aluminum trihexyl, the reaction was stopped by the addition of 10 cc. of methanol which contained 0.1 gram of phenyl-beta-naphthylamine.

The product was purified and isolated in the same manner as described in Example 1. After drying under a vacuum, about 2.5 grams of a solid product were obtained. This product was amorphous by X-ray examination, looked like a non-vulcanized elastomer and was completely soluble in boiling n-heptane. An infrared spectrographic examination showed the presence of double bonds with bands at about 6.1 microns and methyl groups with bands at about 7.25 microns. Methylenic sequences of various lengths with bands between 13.3 and 14 microns were also observed. The ethylene-propylene-cyclopentene terpolymer was vulcanized with the ingredients disclosed in Example 4.

EXAMPLE 6

Approximately 20 cc. of cyclopentene were introduced into the reaction apparatus as described in Example 4. An ethylenepropylene mixture in the molar ratio of about 1:2 was introduced through the gas inlet tube and circulated at the flow rate of about 150 N liters/hour. The catalyst was preformed in a 100 cc. flask at a temperature of about $-20°$ C., under nitrogen. The catalyst was formed by reacting approximately 1 millimole of vanadium tetrachloride and 2.5 millimols of aluminum trihexyl in 10 cc. of anhydrous n-heptane. This catalyst was siphoned into the reactor under pressure of nitrogen.

The gaseous mixture was continuously fed into the reactor at a flow rate of about 150 N liters/hours. After about 6 minutes, the reaction was stopped by the addition of 10 cc. of methanol which contained about 0.1 gram of phenylbetanaphthylamine.

The product was purified and isolated in the manner described in Example 4. After vacuum drying, about 3.5 grams of a solid product were obtained. This product was amorphous as indicated by X-ray examination, looked like a non-vulcanized elastomer and was completely soluble in boiling n-heptane. The infrared spectrographic examination showed the presence of double bonds with bands at about 6.1 microns and methyl groups with bands at about 7.25 microns. The presence of methylenic sequencies of various lengths was indicated with bands between 13.3 and 14 microns. The ethylene-propylene-cyclopentene terpolymer was vulcanized in the same manner and with the same ingredients used in Example 4.

Vulcanized lamina had the following characteristics:

Tensile strength—48 kg./cm.$^2$
Elongation at break—520%
Modulus at 300%—15 kg./cm.$^2$

EXAMPLE 7

Approximately 20 cc. of cyclopentene were introduced into the reaction apparatus as described in Example 4 and held at a temperature of $-10°$ C. A mixture of butene-1 and ethylene in a molar ratio of about 3:1 was introduced through the gas inlet tube and circulated at the flow rate of about 150 N liters/hour for 15 minutes. Approximately 1 millimole of vanadium oxychloride and 2.5 millimols of aluminum triethyl were introduced into the reaction vessel.

The butene-1-ethylene mixture was continuously fed and discharged at the rate of about 150 N liters/hour. After about 15 minutes from the time the aluminum triethyl was introduced into the reaction chamber, the reaction was stopped by adding 10 cc. of methanol which contained 0.1 gram of phenylbetanaphthylamine. The product was purified and isolated in the same manner as described in Example 4. After vacuum drying, 2 grams of a solid product were obtained. This product was amorphous as indicated by X-ray examination, looked like a non-vulcanized elastomer and was completely soluble in boiling n-heptane. The infrared spectrographic examination of the product showed the presence of double bonds with bands at about 6.1 microns and methyl groups with bands at about 7.25 microns. In addition, ethyl groups with bands at about 13 microns and methylenic sequences of various lengths ranging between 13.3 and 14 microns were also observed.

The ethylene-butene-cyclopentene terpolymer was vulcanized in the same manner and with the same ingredients as disclosed in Example 4.

EXAMPLE 8

Approximately 20 cc. of radioactive cyclohexene were introduced into the reaction apparatus as described in Example 1. A propylene-ethylene mixture in a molar ratio of about 2:1 was introduced through the gas inlet tube and circulated at the flow rate of about 150 N liters/hour.

The catalyst was preformed in a 50 cc. flask at a temperature of about $-20°$ C. under pressure by reacting 1 millimole of vanadium tetrachloride with 2.5 millimols of aluminum trihexyl in 10 cc. of anhydrous n-heptane. The preformed catalyst was then siphoned into the reactor under a pressure of nitrogen. The ethylene-propylene mixture was continuously circulated at a flow rate of about 150 N liters/hour. After about 5 minutes from the time the catalyst was introduced into the reaction chamber, the reaction was stopped by adding 10 cc. of methanol which contained 0.1 gram of phenylbetanaphthylamine.

The product was purified and isolated as described in Example 4. After vacuum drying, 3.5 grams of a solid product were obtained. The product was amorphous as indicated by X-ray examination, looked like a non-vulcanized elastomer and was completely soluble in boiling n-heptane. A radiochemical analysis showed the presence of cyclohexene in the polymer.

EXAMPLE 9

Approximately 20 cc. of radioactive cyclooctene were introduced into the reaction apparatus as described in Example 4 and held at a temperature of about $-20°$ C. A propylene-ethylene mixture in the molar ratio of about 2:1 was introduced through the gas inlet tube and circulated at a flow rate of about 150 N liters/hour.

In a 50 cc. flask the catalyst was preformed at a temperature of about $-20°$ C., under pressure of nitrogen, by reacting one millimole of vanadium tetrachloride and 2.5 millimols of aluminum trihexyl in 10 cc. of anhydrous n-heptane. The catalyst thus prepared was siphoned into the reactor under a pressure of nitrogen. The propylene-ethylene mixture was continuously fed and discharged at the flow rate of about 150 N liters/hour. After about 20 minutes from the time the catalyst was introduced into the reaction chamber, the polymerization reaction was stopped by the addition of 10 cc. of methanol which contained 0.1 gram of phenylbetanaphthylamine.

The product was purified and isolated in the same manner as described in Example 4. After vacuum drying, about 4 grams of the solid product were obtained. This product was amorphous as indicated by X-ray examination, looked like a non-vulcanized elastomer and was completely soluble in boiling n-heptane. The radiochemical analysis showed the presence of cyclooctene.

EXAMPLE 10

About 20 cc. of radioactive 4-methyl cyclopentene-1 were introduced into the reaction apparatus described in Example 4 and held at $-20°$ C. A propylene-ethylene mixture in the molar ratio of about 2:1 was introduced through the gas inlet tube and circulated at the flow rate of about 150 N liters/hour. In a 50 cc. flask, the catalyst was preformed at a temperature of about −20° C. under nitrogen by reacting 1 millimole of vanadium oxytrichloride and 2.5 millimols of aluminum trihexyl in 10 cc. of anhydrous n-heptane. The catalyst thus prepared was siphoned into the reactor under the pressure of nitrogen. The propylene-ethylene mixture was continuously fed and discharged at the flow rate of about 50 N liters/hour.

After about 10 minutes from the introduction of the catalyst, the polymerization reaction was stopped by the addition of 10 cc. of methanol, which contained 0.1 gram of phenylbetanaphthylamine.

The product was purified and isolated in the same manner described in Example 4. After vacuum drying, 2.8 grams of a solid product were obtained. This product was amorphous as indicated by X-ray examination, looked like a non-vulcanized elastomer and was completely soluble in boiling n-heptane.

The radiochemical analysis of the product showed the presence of methyl cyclopentene and the infrared spectrographic examination showed the presence of methyl cyclopentene and the infrared spectrographic examination showed the presence of olefinic unsaturations.

EXAMPLE 11

Approximately 20 cc. of cyclopentene were introduced into the reaction apparatus as described in Example 4 and held at a temperature of about −20° C. A gaseous propylene-ethylene mixture in the ratio of about 2:1 was introduced through the gas inlet tube and circulated at the flow rate of about 150 N liters/hour. The solvent was saturated with the gaseous mixture and 1 millimole of vanadium tetrachloride with 2 millimols of aluminum trihexyl were introduced into the reactor.

The ethylene-propylene mixture was continuously circulated at the flow rate of about 150 N liters/hour. After about 8 minutes from the introduction of the catalyst into the reactor, the polymerization was stopped by the addition of 10 cc. of methanol which contained 0.1 gram of phenylbetanaphthylamine. The product was purified and isolated in the same manner as described in Example 4. After vacuum drying, 4.5 grams of a solid product were obtained. This product was amorphous as indicated by X-ray examination, looked like a non-vulcanized elastomer and was completely soluble in boiling n-heptane.

An infrared spectrographic examination showed the presence of double bonds with bands at about 6.1 microns and methyl groups with bands at 7.25 microns. In addition, methylenic sequences of various lengths ranging between 13.3 and 14 microns were also shown.

The ethylene-propylene-cyclopentene terpolymer was vulcanized in the same manner and with the ingredients as disclosed in Example 4. A lamina was obtained which had the following characteristics:

Tensil strength—40 kg./cm.$^2$
Elongation at break—550%
Modulus at 300%—20 kg./cm.$^2$ The new polymeric products of this invention have a variety of uses but more particularly in the field of elastomers. It was found that products which contained a small amount of olefinic unsaturation derived from ring-opened cycloolefin units, could be vulcanized with methods commonly used for low-unsaturated polymers.

While the invention has been described with a number of illustrative examples, it is obvious that other modifications and variations may be resorted to without departing from the true spirit of the invention.

What is claimed is:
1. A process for preparing unsaturated, substantially linear, substantially amorphous copolymers containing polymerized units of:
  (a) ethylene,
  (b) at least one alpha-olefin having the general formula $CH_2=CHR$, wherein R is an alkyl radial containing 1 to 4 carbon atoms, and
  (c) mono-cyclomonoolefins and alkyl substituted mono-cyclomonoolefins containing approximately 4 to 8 carbon atoms in the ring,
which comprises reacting a mixture of (a), (b) and (c) in contact with a catalyst prepared from a hydrocarbon-soluble vanadium compound and an organometallic compound having the formula $M(alkyl)_x (halide)_y$, wherein M is a metal selected from the group consisting of aluminum, beryllium and lithium, $x$ is at least one, and $x+y$ equals the valence of the metal, at a temperature of from −80° C. to +100° C., and in the liquid phase.

2. The process according to claim 1, further characterized in that the vanadium compound is selected from the group consisting of vanadium trichloride and vanadium oxychloride.

3. The process according to claim 1, further characterized in that the vanadium compound is selected from the group consisting of vanadium triacetylacetonate, vanadyl diacetylacetonates, vanadium chloroacetylacetonates and vanadium alkyl orthovanadates.

4. The process according to claim 1, further characterized in that the organometallic compound is an aluminum dialkylmonohalide.

5. The process according to claim 1, further characterized in that the organometallic compound is an aulminum trialkyl.

6. The process according to claim 1, further characterized in that the copolymerization reaction is carried out at a temperature ranging from about −50° C. to +50° C.

7. The process according to claim 1, further characterized in that the organometallic compound is an aluminum compound which also contains an electron donor group.

8. Substanatially linear, substantially amorphous copolymers consisting essentially of polymerized units of
  (a) ethylene;
  (b) at least one alpha-olefin having the general formula $CH_2=CHR$ wherein R is an alkyl radical containing 1 to 4 carbon atoms; and
  (c) monocyclomoolefins and alkyl-substituted monocyclomonoolefins containing from 4 to 8 carbon atoms in the ring, polymerized units of the cyclic monomer in the copolymer showing unsaturations due to opening of the cycle during the copolymerization without splitting of the double bond therein.

9. Coplymers according to claim 8, further characterized in comprising macromolecules made up of polymerized units of ethylene, of propylene, and of cyclopentene.

10. Copolymers according to claim 9, further characterized in containing up to 10% of polymerized units of the cyclopentene which contain an olefinic double bond as a result of opening of the cyclopentene ring.

11. The copolymers according to claim 8, further characterized in comprising macromolecules made up of polymerized units of ethylene, of propylene, and of cyclohexene.

12. Copolymers according to claim 8, further characterized in comprising macromolecules made up of polymerized units of ethylene, of propylene, and of cycloheptene.

13. Copolymers according to claim 8, further characterized in comprising macromolecules made up of polymerized units of ethylene, of propylene, and of cyclooctene.

14. Copolymers according to claim 8, further charterized in comprising macromolecules made up of polymerized units of ethylene, of propylene, and of 4-methyl-cyclopentene-1.

15. Copolymers according to claim 8, further characterized in containing up to 10% of polymerized units of the monocyclic monomer which units contain an olefinic double bond resulting from opening of the ring.

16. Copolymers according to claim 8, further characterized in comprising macromolecules made up of polymerized units of ethylene, of butene-1, and of the monocyclic monomer.

17. Copolymers according to claim 16, further characterized in containing up to 10% of polymerized units of the monocyclic olefin which units contain an olefinic double bond resulting from opening of the ring.

References Cited

UNITED STATES PATENTS

| | | | |
|---|---|---|---|
| 3,063,973 | 11/1962 | Gladding | 260—80.78 |
| 3,211,709 | 10/1965 | Adamek | 260—80.78 |
| 3,385,840 | 5/1968 | Natta | 260—88.2 |
| 3,403,139 | 9/1968 | Natta | 260—88.2 |
| 3,383,349 | 5/1968 | Grasley | 269—28.5 |

OTHER REFERENCES

Truett, Johnson, Robinson, & Montague, Polynorbornene by Coordination Polymerization, J. Am. Chem. Soc. vol. 82, 2337–40, 1960

JOSEPH L. SCHOFER, Primary Examiner

R. S. BENJAMIN, Assistant Examiner

UNITED STATES PATENT OFFICE
CERTIFICATE OF CORRECTION

Patent No. 3,505,301      Dated April 7, 1970

Inventor(s) GIULIO NATTA ET AL

It is certified that error appears in the above-identified patent and that said Letters Patent are hereby corrected as shown below:

In the heading to the printed specification, after line 13, insert -- Claims priority, application Italy, May 23, 1962, 10,314/62--.

Column 1, line 9 of the text beginning with "Abstract Of The Disclosure", should read -- high molecular weight copolymers and more specifically copolymers of ethylene, cycloolefins or --; line 38 of the text beginning with "Abstract Of The Disclosure", "(1) monomeric units derived from ethylene." should read -- (1) Polymerized units of ethylene --; column 3, line 5, "vanadylacetyl acetonates" should read -- vanadyldiacetyl acetonates --; column 8, line 2, "radial" should read -- radical --; line 28, "aulmium" should read -- aluminum --; line 42, beginning with (c), "monocyclomoolefins" should read -- monocyclomonoolefins --; lines 68 and 69, "charterized" should read -- characterized --.

Signed and sealed this 1st day of May 1973.

(SEAL)
Attest:

EDWARD M. FLETCHER, JR.
Attesting Officer

ROBERT GOTTSCHALK
Commissioner of Patents